US007656892B2

(12) United States Patent
Barak et al.

(10) Patent No.: US 7,656,892 B2
(45) Date of Patent: Feb. 2, 2010

(54) METHOD AND APPARATUS OF MULTI-ENTITY WIRELESS COMMUNICATION ADAPTER

(75) Inventors: Amit Barak, Haifa (IL); Yuval Bachrach, Haifa (IL); Boris Ginzburg, Haifa (IL)

(73) Assignee: Intel Corporation, Santa Clara, CA (US)

( * ) Notice: Subject to any disclaimer, the term of this patent is extended or adjusted under 35 U.S.C. 154(b) by 658 days.

(21) Appl. No.: 11/239,163

(22) Filed: Sep. 30, 2005

(65) Prior Publication Data

US 2007/0076597 A1    Apr. 5, 2007

(51) Int. Cl.
*H04J 3/02* (2006.01)
(52) U.S. Cl. ...................... 370/462; 370/449
(58) Field of Classification Search .......... 370/252, 370/253, 310, 401, 465
See application file for complete search history.

(56) References Cited

U.S. PATENT DOCUMENTS

| | | | |
|---|---|---|---|
| 6,526,264 B2* | 2/2003 | Sugar et al. .................. 455/84 |
| 6,728,517 B2* | 4/2004 | Sugar et al. .................. 455/73 |
| 7,206,840 B2* | 4/2007 | Choi et al. ................. 709/225 |
| 7,330,696 B2* | 2/2008 | Orlassino et al. ........... 455/41.2 |
| 7,333,830 B2* | 2/2008 | Malone .................... 455/552.1 |
| 7,359,459 B2* | 4/2008 | Shvodian et al. ............ 375/316 |
| 7,389,352 B2* | 6/2008 | Cromer et al. .............. 709/227 |
| 7,395,040 B2* | 7/2008 | Behzad .................... 455/168.1 |
| 2003/0054788 A1* | 3/2003 | Sugar et al. ................. 455/323 |
| 2004/0116075 A1* | 6/2004 | Shoemake et al. ......... 455/41.2 |
| 2004/0235439 A1* | 11/2004 | Husted et al. .............. 455/136 |
| 2005/0063416 A1* | 3/2005 | Shin et al. .................. 370/465 |
| 2005/0170776 A1* | 8/2005 | Siorpaes ................... 455/41.2 |
| 2005/0174962 A1* | 8/2005 | Gurevich .................... 370/328 |
| 2006/0030265 A1* | 2/2006 | Desai et al. ................ 455/41.2 |
| 2006/0030266 A1* | 2/2006 | Desai et al. ................ 455/41.2 |
| 2006/0068837 A1* | 3/2006 | Malone .................... 455/552.1 |
| 2006/0084469 A1* | 4/2006 | Malone et al. ............ 455/552.1 |
| 2006/0133304 A1* | 6/2006 | Tanach ....................... 370/311 |
| 2006/0215601 A1* | 9/2006 | Vleugels et al. ............ 370/328 |

OTHER PUBLICATIONS

Chandra et al.: "MultiNet: Connecting to Multiple IEEE 802.11 Networks Using a Single Wireless Card", Proceedings of IEEE Infocom 2004, Mar. 2004.

* cited by examiner

*Primary Examiner*—Ricky Ngo
*Assistant Examiner*—Ben H Liu
(74) *Attorney, Agent, or Firm*—Pearl Cohen Zedek Latzer, LLP

(57) ABSTRACT

Embodiments of the present invention provide a method and apparatus for a multi-entity wireless communication adapter having a traffic management configuration to selectively associate at least first and second signal traffics corresponding to a basic service set station entity and an independent basic service set entity, respectively, with a shared physical layer which is able to process said first and second signal traffics. Additional features are described and claimed.

15 Claims, 2 Drawing Sheets

METHOD AND APPARATUS OF MULTI-ENTITY WIRELESS COMMUNICATION ADAPTER

BACKGROUND OF THE INVENTION

A conventional use case network may include concurrent local and personal area wireless networks. For example, a laptop or notebook computer may connect to, e.g., a wireless bridge or a remote printer, over a wireless local area network (WLAN) and to a peripheral device, e.g., a projector or a storage device, over a wireless personal area network (WPAN).

One method for implementing a concurrent wireless local and personal area network is to equip a device with two independent wireless adapters, which may operate according to the same wireless protocol or two different wireless protocols. For example, "IEEE Std 802.11, 1999 Edition (ISO/IEC 8802-11: 1999)" defines a set of standards for WLAN communication and "IEEE Std 802.15.1-2002 defines a set of standards for WPAN communication. Using two independent adapters may involve doubling of physical resources such as, for example, baseband processors and/or radio frequency circuitry.

Another option is to utilize the same adapter for both WLAN and WPAN communication by allowing the user to manually switch between the two modes. For example, an 802.11 network interface card (NIC) may normally operate as part of a basic service set (BSS) in a WLAN, but may be manually switched to operate as part of an independent basic service set (IBSS), e.g., in a WPAN, by allowing peer-to-peer communication. However, a manually switched adapter may only connect to one network, for example, either a WPAN or a WLAN, at any given time.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
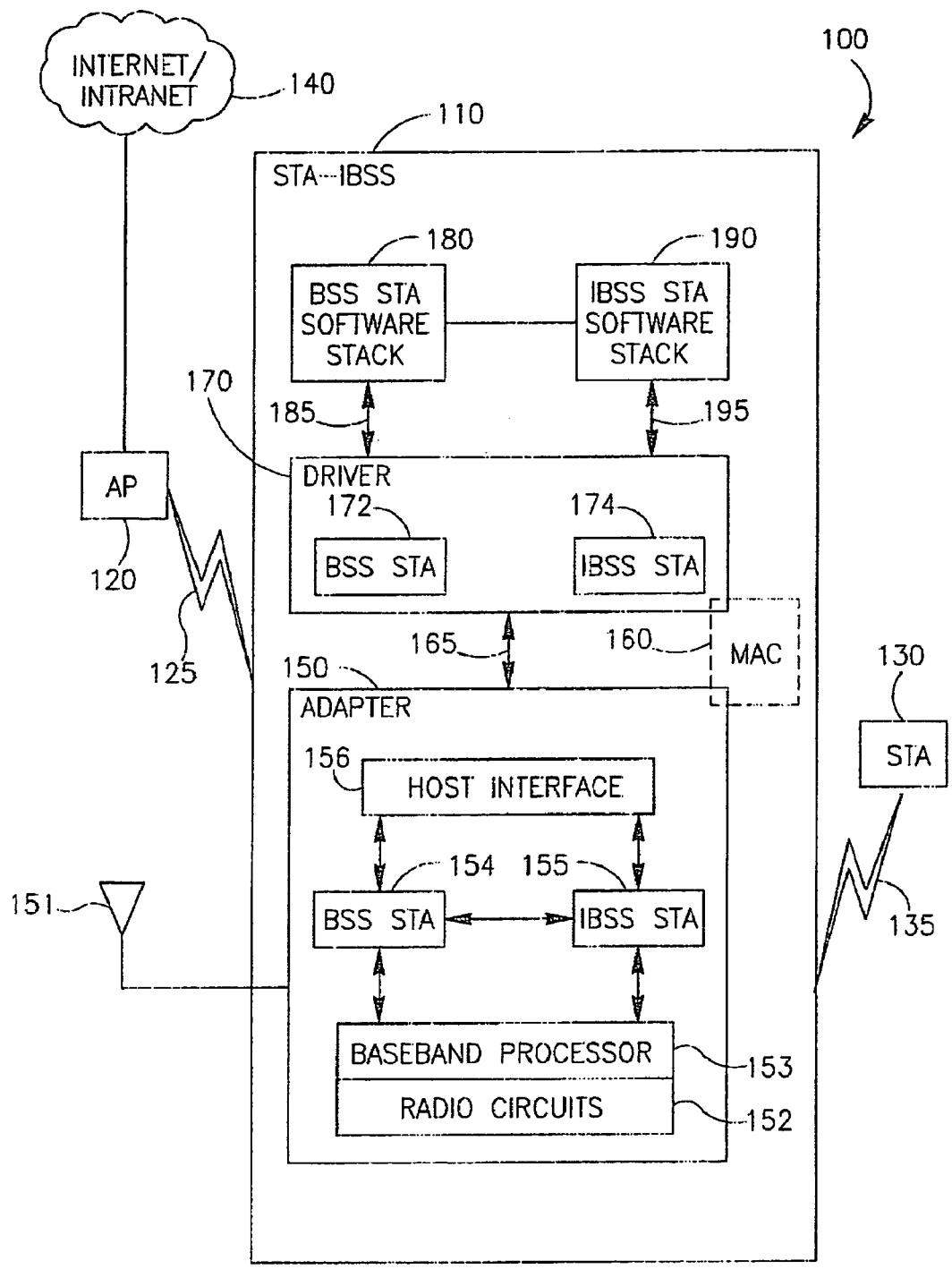
FIG. 1 is a schematic illustration of a wireless communication system including one or more communication devices having a multi-entity wireless adapter according to a demonstrative embodiment of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that the present invention may be used in a variety of applications. Although the present invention is not limited in this respect, the circuits and techniques disclosed herein may be used in many apparatuses such as personal computers, stations of a radio system, wireless communication system, digital communication system, satellite communication system, and the like.

Stations intended to be included within the scope of the present invention include, by way of example only, wireless local area network (WLAN) stations, wireless personal area network (WPAN) stations, two-way radio stations, digital system stations, analog system stations, cellular radiotelephone stations, and the like.

Types of WLAN communication systems intended to be within the scope of the present invention include, although are not limited to, "IEEE-Std 802.11, 1999 Edition (ISO/IEC 8802-11: 1999)" standard, and mote particularly in "IEEE-Std 802.11b-1999 Supplement to 802.11-1999, Wireless LAN MAC and PHY specifications: Higher speed Physical Layer (PHY) extension in the 2.4 GHz band", "IEEE Std 802.11a-1999, Higher speed Physical Layer (PHY) extension in the 5 GHz band," standard and the like.

Types of WLAN stations intended to be within the scope of the present invention include, although are not limited to, stations for receiving and transmitting spread spectrum signals such as, for example, Frequency Hopping Spread Spectrum (FHSS), Direct Sequence Spread Spectrum (DSSS), Orthogonal frequency-division multiplexing (OFDM) and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a personal area network (PAN), local area network (LAN), wide area network (WAN), or a global communication network, for example, the Internet.

Some embodiments of the invention provide a method and apparatus for concurrent operation of multiple entities, e.g., a basic service set (BSS) station (STA) and an independent basic service set (IBSS) node, substantially simultaneously over a shared baseband processor and radio frequency circuits. In a wireless communication system, it may be desirable for a device to maintain concurrent association and/or signal traffic with devices in both local and personal area networks. For example, it may be desirable to maintain concurrent association and/or signal traffic with an access point of a WLAN, e.g., to operate as a BSS STA entity, while maintaining concurrent association and/or traffic with peripheral devices, e.g., to operate as an IBSS node of a WLAN or WPAN.

Reference is made to FIG. 1, which schematically illustrates a wireless communication system 100 including local area and personal area network elements in accordance with a demonstrative embodiment of the present invention. It will be appreciated by those skilled in the art that the simplified components schematically illustrated in FIG. 1 are intended for demonstration purposes only, and that other components may be required for operation of the wireless devices. Those of skill in the art will further note that the connection between components in a wireless device need not necessarily be exactly as depicted in the schematic diagram.

Although the invention is not limited in this respect, wireless communication system 100 may include at least one multiple-entity ("multi-entity") device, for example, a dual entity STA-IBSS device 110, an access point (AP) 120 of a wireless network 125, for example, a WLAN, and a peripheral station 130 of an additional network 135, for example, a WPAN. In accordance with embodiments of the invention, dual-entity STA-IBSS 110 may be able to maintain concurrent association and/or signal traffic with AP 120 over a link 125 of a WLAN, e.g. to operate as a BSS STA entity, while maintaining concurrent association and/or signal traffic with STA 130 over a link 135 of a WPAN, e.g., to operate as an IBSS node. In addition, a plurality of dual-entity devices 110 may be in communication with one another and/or with a wider intranet or the Internet 140, e.g., via AP 120 over link 125 of a WLAN. The dual-entity devices 110 may also be in communication with one another via, e.g., link 135 of a WPAN.

Although the invention is not limited in this respect, dual-entity STA-IBSS 110 may include a basic service set STA entity software stack 180, an IBSS station entity software stack 190, a driver 170, and a multi-entity adapter, e.g., a dual-entity adapter 150. Dual-entity adapter 150 may be associated with a radio frequency antenna 151, e.g., a dipole antenna, omnidirectional antenna, semi-omnidirectional antenna, or any other antenna suitable for transmission and/or reception of radio frequency signals. Software stacks 180 and 190 may include, e.g., software for implementing network protocols of the application layer, presentation layer, session layer, transport layer, and network layer of the seven-layer Open Systems Interconnection (OSI) reference model for network communication, as is known in the art. For example, a network application in BSS STA stack 180 may generate data to be transmitted to a network application in intranet 140, via AP 120 over link 125, e.g., of a WLAN, and a network application in IBSS STA stack 190 may generate data to be transmitted to a network application in STA 130 over link 135, e.g., of a WPAN. In another example, IBSS software stack 190 may include networking software with routing capabilities to allow range extension of AP 120 or sharing of Internet connection 140. According to the appropriate network protocols, data packets 185 from stack 180 and data packets 195 from stack 190 may be transmitted to driver 170. In accordance with some demonstrative embodiments of the invention, during transmission driver 170 may provide an output in the form of data frames 165 to be further processed by adapter 150. During reception, driver 170 may receive data frames 165 from adapter 150 to be processed into data packets for software stacks 180 and 190.

According to some demonstrative embodiments of the invention, dual-entity STA-IBSS 110 may include a media access controller (MAC) 160. It will be appreciated by those skilled in the art that MAC 160 may include mechanisms to control data transfer, including, for example, to transmit and receive frames, to delimit frames, to check for errors, to insert headers with MAC addresses for routing, to route frames according to MAC addresses, and to control timing and/or permissions of transmit queues of data and management frames. MAC 160 may be implemented by any combination of hardware and/or software in different parts of STA-IBSS 110, for example, parts of driver 170 and/or adapter 150, as explained in detail below.

According to some demonstrative embodiments of the invention, driver 170 may include, for example, a STA upper MAC 172 to process data packets 185 and an IBSS station upper MAC 174 to process data packets 195. For example, upper MAC 172 and 174 may be a higher layer MAC (HMAC) according to the 802.11 standards, as is known in the art. It will be appreciated by those skilled in the art that driver 170 perform tasks including, for example, translation of frames between different network protocols, or operations that ale not timing-critical, such as rate scaling or reassembly of fragmented received frames. According to some demonstrative embodiments of the invention, upper MACs 172 and 174 may be implemented as separate modules or as components of the same module. In accordance with other demonstrative embodiments of the invention, the functionality of upper MACs 172 and 174 may be included in components of adapter 150.

According to some demonstrative embodiments of the invention, the multi-entity adapter, e.g., dual-entity adapter 150, may be capable of providing functionality for a BSS STA entity, an IBSS node entity, or concurrent STA-IBSS entity. In addition, the multi-entity adapter may be able to maintain concurrent association with multiple networks, e.g., an 802.11 WLAN BSS, an 802.11 IBSS WPAN, and/or any other suitable network as is known in the art, and may be referred to as a multi-network adapter. In accordance with demonstrative embodiments of the invention, the multiple networks, e.g., BSS WLAN and IBSS WPAN, may operate using the same radio frequency channel or separate radio frequency channels. Dual-entity adapter 150 may include a BSS STA connection module 154 and an IBSS STA connection module 155 to control timing-critical MAC operations involved in reception and transmission of signal traffic of the respective entities, as explained in detail below with reference to FIG. 2. For example, connection modules 154 and 155 may provide functionality of a lower MAC, as it is known in the art. In accordance with embodiments of the invention, connection modules 154 and 155 may operate over a shared physical layer including baseband processor 153 and radio frequency circuits 152, as described in detail below.

Dual-entity adapter 150 may also include a host interface module 156 to provide interface between the driver and adapter. The host interface module may handle transfer of data and commands between driver 170 and connection modules 154 and 155, e.g. it may act as a bus master and initiate transactions over interface 165, or it may respond to transactions initiated by driver 170, in which case host interface module 156 may act as a bus target or slave. Although the invention is not limited in this respect, connection modules 154 and 155 may, e.g., facilitate transmitting and receiving of data signals to and from host interface 156 and the shared physical layer. In accordance with different demonstrative embodiments of the invention, BSS STA connection module 154 and IBSS node connection module 155 may be implemented using hardware, software, and/or any suitable combination of software and hardware, either within separate lower MACs or within the same lower MAC, and may also include additional functionality of MAC 160, for example, the non-timing critical functionality of upper MACs 172 and 174 described above.

According to some demonstrative embodiments of the invention, during transmission host interface 156 may transmit data to connection modules 154 and 155, e.g., lower MACs, to be transmitted to the physical layer. In accordance with network protocols, lower MACs 154 and 155 may wait for a clear channel indication, for example, reception of a clear channel assessment (CCA) signal from the physical layer, before transmitting. In accordance with embodiments of the invention, the CCA signal may be responsive to transmissions of one or more lower MAC modules within the multi-entity adapter, as explained in detail below with reference to FIG. 2. In addition, lower MAC modules 154 and 155 may handle aspects of the transmission flow such as, for example, handshake frames, acknowledgement frames, retransmission of frames, and request-to-send (RTS)—clear-to-send ((CTS) conversation.

Although the invention is not limited in this respect, during reception BSS STA connection module 154 or IBSS connection module 155 may send a receive enable signal to the physical layer in order to activate the receiver parts of the physical layer, e.g., radio circuits 152 and baseband processor 153. Radio circuits 152 and baseband processor 153 may convert radio signals received via antenna 151, including, e.g., data frames for both the IBSS and BSS STA entities of dual-entity communication device 110, into a digital data stream for further processing by connection modules 154 and 155. For example, connection modules 154 and 155 may perform lower MAC functions including, for example, cyclic redundancy checks (CRC), transmission of acknowledgement frames, and MAC address filtering. According to demonstrative embodiments of the invention, connection modules 154 and 155 may, in addition, receive data streams transmitted by other connection modules within the multi-entity adapter as explained in detail below with reference to FIG. 2.

Although the invention is not limited in this respect, the multi-entity adapter, e.g., dual-entity adapter 150, may transmit and receive signal traffics, including management flames, e.g., beacons, probe requests, and probe responses; control frames, e.g., request-to-send (RTS) and clear-to-send (CTS); and data frames, e.g., broadcasts, multicasts, or unicasts; for an IBSS node entity and a BSS STA entity, which may be concurrently associated with a WLAN and a WPAN. For example, dual-entity adapter 150 may interleave BSS STA and IBSS node data and management frames 165 using the same baseband and radio components. The associated MAC 160 may control the timing of the BSS STA and IBSS node entities such that the BSS STA entity may maintain connection and signal traffic with a network AP, e.g., AP 120, while the IBSS node entity may send beacons and keep PAN client device, e.g., peripheral STA 130, associations and signal traffic active. In accordance with different embodiments of the invention, the multi-entity adapter may transmit and receive all flames on a single channel, or the adapter may transmit and receive signal traffic for the BSS STA entity on one channel and for the IBSS node entity on a different channel.

Although the invention is not limited in this respect, the multi-entity adapter, e.g., a multi-network adapter, may associate and authenticate to an access point, e.g., AP 120 of a WLAN, and transfer data to and from the access point, as a BSS STA entity. During that time it may also establish an IBSS node and allow other stations, e.g., STA 130 of a WPAN, to associate and authenticate to the IBSS, and to transfer data to and from the IBSS upper and lower MACs 174 and 155, respectively. In accordance with embodiments of the invention, peripheral devices may connect to dual-entity adapter 150 even if they do not have access to WLAN infrastructure. Alternatively, dual-entity adapter 150 may also be configured to require infrastructure LAN access rights from peripherals. Access rights may be managed by IBSS lower MAC 155, IBSS upper MAC 174, IBSS software stack 190, or by a combination thereof.

Figure 2:
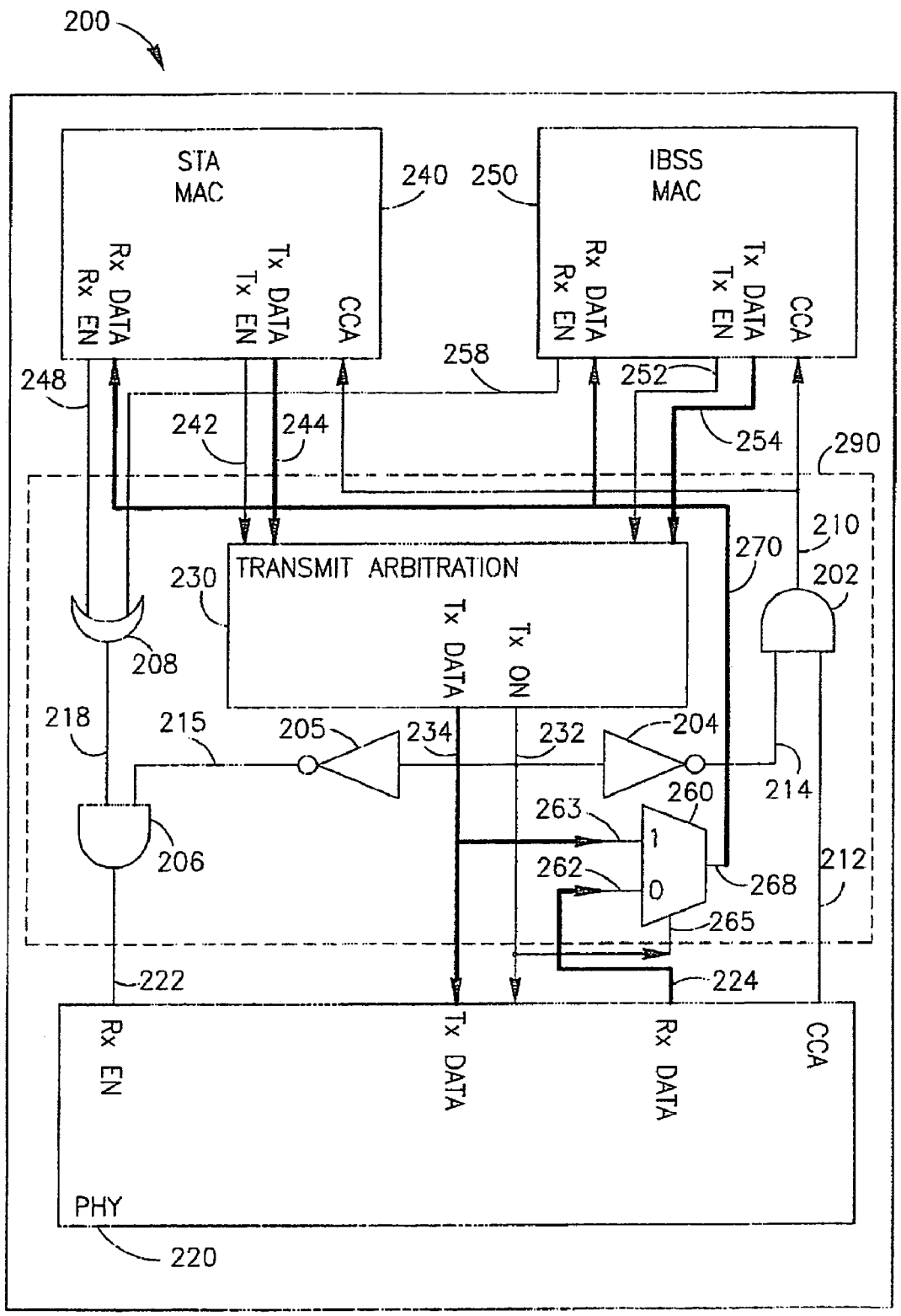
FIG. 2 is a schematic illustration of a part of a multi-entity wireless communication device according to a demonstrative embodiment of the invention.

Reference is made to FIG. 2, which schematically illustrates a part of a multi-entity wireless communication device 200 according to a demonstrative embodiment of the invention. Although the invention is not limited in this respect, components of device 200 may correspond to components of adapter 150 illustrated in FIG. 1. For example, device 200 may include a STA MAC 240 and an IBSS MAC 250, which may correspond to connection modules 154 and 155 of FIG. 1, respectively. In addition, device 200 may include a physical layer (PHY) 220, which may correspond to baseband processor 153 and radio frequency circuits 152 of FIG. 1.

In accordance with demonstrative embodiments of the invention, PHY 220 may be shared by the multiple entities of multi-entity device 200, e.g., STA MAC 240 and IBSS MAC 250. According to some demonstrative embodiments of the invention, multi-entity device 200, e.g., a dual-entity STA-IBSS adapter such as adapter 150 of FIG. 1, may include a traffic management mechanism 290 to selectively associate signal traffic of the multiple entities of device 200 with the shared physical layer. Although the invention is not limited in this respect, traffic management mechanism 290 may include a transmit arbitration unit 230, a multiplexer 260, and at least one logical gate, e.g., gates 202, 204, 205, and 206.

During transmission, the multiple entities of multi-entity device 200, e.g., STA MAC 240 and IBSS MAC 250, may transmit data signals 244 and 254, respectively, to transmit arbitrator 230, along with transmit enable signals 242 and 252 to indicate, e.g., that the data signals 244 and 254 are valid. Although the invention is not limited in this respect, transmit arbitrator 230 may include mechanisms to transfer one of multiple data signals through to the physical layer 220 to be transmitted, e.g., over a link of a wireless network as part of the signal traffic of, e.g., either a BSS STA entity or an IBSS node entity. Although the invention is not limited in this respect, arbitrator 230 may select a data signal for transmission according to an arbitration policy such as, e.g., memoryless random selection, prioritized selection, round-robin access, or any other suitable policy as is known in the art. Transmit arbitrator 230 may transmit a data signal 234 to PHY 220, which may correspond, for example, to either data signal 244 from STA MAC 240 or data signal 254 from IBSS MAC 250. In addition, according to some demonstrative embodiments of the invention transmit arbitrator 230 may generate a transmission on signal 232 in response to transmission of data signal 234.

According to some demonstrative embodiments of the invention, as stated above, MACs 240 and 250 may wait for a CCA signal 210 before transmission of data signals 244 and 254 and transmission enable signals 242 and 252. CCA signal 210 may indicate the channel is clear for transmission, taking into account the multiple entities and signal traffics of multi-entity device 200. For example CCA signal 210 may be produced by a logical AND operation 202 on a CCA signal 212 from PHY 220 and a transmission clear signal 214 from transmit arbitrator 230. Transmission clear signal 214 may be produced by a logical NOT operation 204 on transmission on signal 232 of arbitrator 230.

According to some demonstrative embodiments of the invention, it may be desirable to enable the multiple MAC entities of multi-entity device 200, e.g., STA MAC 240 and IBSS MAC 250, to communicate with one another. Although the invention is not limited in this respect, traffic management mechanism 290 may include multiplexer 260 having, e.g., two inputs 262 and 263, a control 265, and an output 268. For example, input 262 may correspond to a received data signal 224 from PHY 220 and input 263 may correspond to data signal 234 from transmit arbitrator 230. In accordance with some demonstrative embodiments of the invention, transmission on signal 232 may enter the multiplexer control 265 to determine whether to transfer received signal 224 or data signal 234 to the multiple entities of device 200. For example, if the transmission on signal indicates that a data signal 234 is being transmitted, the data signal 234 from input 263 may transfer to output signal 268. If the transmission on signal is not received at switch control 265, the received signal 224 from input 265 may transfer to output signal 268.

In accordance with some demonstrative embodiments of the invention, the multiple MAC entities of device 200 may receive a data signal 270 corresponding to signal traffic of either a different MAC entity within the multi-entity device or of a separate wireless communication device, e.g., an AP of a WLAN or a station of a WPAN. The MAC entities, e.g., STA MAC 240 and IBSS MAC 250 may include mechanisms to filter out and discard data frames of received data signal 270 that are not addressed to the MAC entity.

According to some demonstrative embodiments of the invention, PHY 220 may be half-duplex and may not be able to both transmit and receive signals at the same time. For example, according to one demonstrative embodiment of the invention PHY 220 may be in receive mode whenever not transmitting. Although the invention is not limited in this respect, transmit arbitrator may send transmission on signal 232 to PHY 220 in addition to data signal 234, to indicate that at least one MAC entity, e.g., STA MAC 240 or IBSS MAC 250, needs to transmit data. In another demonstrative embodiment of the invention, device 200 may include additional mechanisms to reduce power consumption by e.g., turning off the baseband processor and radio frequency circuits of PHY 220 when no MAC entity needs to transmit or receive data. Although the invention is not limited in this respect, PHY 220 may receive a receive enable signal 222 to indicate that at least one MAC entity is in receive mode and that no MAC entity is transmitting. For example, device 200 may enter a power save mode at times when neither receive enable signal 222 nor transmission on signal 232 is sent to PHY 220.

Although the invention is not limited in this respect, receive enable signal 222 may be produced by a logical AND 206 on a transmission clear signal 215 from transmit arbitrator 230 and a receive enable signal 218 from at least one of the MAC entities of device 200. Transmission clear signal 215 may be produced by a logical NOT operation 205 on transmission on signal 232 of arbitrator 230. Receive enable signal may be produced by a logical OR operation 208 on multiple receive enable signals from the multiple MAC entities of device 200, e.g., a receive enable signal 248 from STA MAC 240 and a receive enable signal 258 from IBSS MAC 250.

It is appreciated that embodiments of the present invention may be implemented by software, by hardware, by firmware, or by any combination of software, hardware, and/or firmware as may be suitable for specific applications in accordance with specific design requirements. Embodiments of the present invention may include units and sub-units, which may be separate of each other or combined together, in whole or in part, and may be implemented using specific, multi-purpose, or general processors or devices as known in the art. Some embodiments of the present invention may include buffers, registers, storage units and/or memory units, for temporary or long-term storage of data and/or in order to facilitate the operation of a specific embodiment.

While the invention has been described with respect to a limited number of embodiments, it will be appreciated that many variations, modifications and other applications of the invention may be made. Embodiments of the present invention may include other apparatuses for performing the operations herein Such apparatuses may integrate the elements discussed, or may comprise alternative components to carry out the same purpose. It will be appreciated by persons skilled in the art that the appended claims are intended to cover all such modifications and changes as fall within the true spirit of the invention.

What is claimed is:

1. An apparatus comprising:
    a traffic management mechanism to selectively associate at least first and second signal traffics corresponding to a basic service set station entity and an independent basic service set entity, respectively, with a shared physical layer which is to process said first and second signal traffics, the traffic management mechanism comprising:
    a transmission arbitration unit to selectively transfer to said physical layer data signals to be transmitted from said basic service set station entity or from said independent basic service set entity, according to an arbitration policy; and
    a logical AND gate to provide a combined channel clear assessment signal to said basic service set station and independent basic service set entities based on a channel clear assessment signal from said physical layer and a transmission clear signal from said transmission arbitration unit.

2. The apparatus of claim 1, wherein said arbitration policy comprises a random selection arbitration policy.

3. The apparatus of claim 1, wherein said arbitration policy comprises a round-robin access arbitration policy.

4. The apparatus of claim 1, wherein said transmission clear signal is responsive to transmission of a data signal corresponding to at least one of said first and second signal traffics.

5. The apparatus of claim 1, wherein said traffic management mechanism comprises a logical AND gate to provide a combined receive enable signal to said physical layer based on a receive enable signal from at least one of said basic service set station and independent basic service set entities, and a transmission clear signal from said transmission arbitration unit.

6. The apparatus of claim 5, wherein said transmission clear signal is responsive to transmission of a data signal corresponding to at least one of said first and second signal traffics.

7. The apparatus of claim 1, wherein said traffic management mechanism comprises a multiplexer to transfer data signals to be received by said basic service set station entity and said independent basic service set entity, said signals corresponding to a data signal from said transmission arbitration unit or to a received data signal from said physical layer.

8. A method comprising:
    managing at least a first signal traffic corresponding to a basic service set station entity and a second signal traffic corresponding to an independent basic service set entity, to be communicated over a shared physical layer; and combining a channel clear assessment signal from said physical layer and a transmission clear signal responsive to transmission of a data signal corresponding to at least one of said first and second signal traffics, to provide a combined channel clear assessment signal to said basic service set station and independent basic service set entities; wherein managing comprises:

selectively transferring to said physical layer data signals to be transmitted from said basic service set station entity or from said independent basic service set entity; and combining, using a logical AND gate, a receive enable signal from at least one of said basic service set station and independent basic service set entities and a transmission clear signal responsive to transmission of a data signal corresponding to at least one of said first and second signal traffics, to provide a combined receive enable signal to said physical layer.

9. The method of claim 8, comprising transferring a data signal produced by either said basic service set station entity or said independent basic service set entity back to said entities to enable intercommunication.

10. A wireless communication system comprising:

a multi-entity wireless communication device comprising:

a traffic management mechanism to selectively associate at least first and second signal traffics corresponding to a basic service set station entity and an independent basic service set entity, respectively, with a shared physical layer which is to process said first and second signal traffics; the traffic management mechanism comprising a transmission arbitration unit to selectively transfer to said physical layer data signals to be transmitted from said basic service set station entity or from said of said independent basic service set entity, according to an arbitration policy and a logical AND gate to provide a combined channel clear assessment signal to said basic service set station and independent basic service set entities based on a channel clear assessment signal from said physical layer and a transmission clear signal from said transmission arbitration unit; and a dipole antenna to transmit and receive signals corresponding to said first and second signal traffics.

11. A system according to claim 10, comprising:

one or more additional wireless communication devices to communicate with said multi-entity wireless communication device over a link of a wireless communication network.

12. A system according to claim 10, wherein said wireless communication network is a wireless local area network.

13. A system according to claim 11, wherein said wireless communication network is a wireless personal area network.

14. A system according to claim 10, wherein said traffic management mechanism comprises a logical AND gate to provide a combined receive enable signal to said physical layer based on a receive enable signal from at least one of said basic service set station and independent basic service set entities, and a transmission clear signal from said transmission arbitration unit.

15. A system according to claim 10, wherein said traffic management mechanism comprises a multiplexer to transfer data signals to be received by said basic service set station entity and said independent basic service set entity, said signals corresponding to a data signal from said transmission arbitration unit or to a received data signal from said physical layer.

* * * * *